United States Patent [19]

Kishimoto et al.

[11] 3,855,865
[45] Dec. 24, 1974

[54] TEMPERATURE SENSING APPARATUS HAVING A GAS ADSORBING ELEMENT CONTAINED IN THE SENSING BULB

[75] Inventors: Hiroyuki Kishimoto, Yokohama; Eiichi Morozumi, Fujisawa, both of Japan

[73] Assignee: Honeywell Inc., Minneapolis, Minn.

[22] Filed: Nov. 15, 1973

[21] Appl. No.: 416,303

[30] Foreign Application Priority Data
Nov. 22, 1972  Japan............................ 47-134642

[52] U.S. Cl. .............................................. 73/368.2
[51] Int. Cl. .............................................. G01k 5/42
[58] Field of Search...................... 73/368.2, 368.6

[56] References Cited
UNITED STATES PATENTS

| | | | |
|---|---|---|---|
| 2,271,307 | 1/1942 | Ray.............................. | 73/368.2 X |
| 2,868,017 | 1/1959 | Beard............................ | 73/368.2 |
| 3,410,141 | 11/1968 | Zurstadt......................... | 73/368.2 |
| 3,715,924 | 2/1973 | Nelson........................... | 73/368 |
| 3,766,783 | 10/1973 | Tortoso.......................... | 73/368.2 |

Primary Examiner—Richard C. Queisser
Assistant Examiner—Frederick Shoon
Attorney, Agent, or Firm—Clyde C. Blinn

[57]  ABSTRACT

A temperature sensing apparatus having an output device connected in a gas filled system by a capillary tube to a bulb containing volatile fluid which evaporates when the bulb increases in temperature to increase the gas pressure in the system. The bulb contains an adsorbing element formed by tightly and cylindrically coiling a sheet of aluminum foil having thereon porous oxide coating by alumina treatment. The adsorbing element has the characteristic of adsorbing gas when subject to dropping temperatures and expelling or giving off the gas when heated.

2 Claims, 3 Drawing Figures

3,855,865

TEMPERATURE SENSING APPARATUS HAVING A GAS ADSORBING ELEMENT CONTAINED IN THE SENSING BULB

BACKGROUND AND SUMMARY OF THE INVENTION

In temperature sensing apparatus gas adsorbing materials have been used in gas filled systems to adsorb the gas when the temperature of the temperature responsive element is lowered. Such adsorbing materials provide for a storage of gas. At some predetermined temperature of the temperature responsive element, the internal pressure of the gas filled system levels off when all of the gas contained in the adsorbing material is driven off into the system.

The William R. Poyle U.S. Pat. No. 2,718,904 discloses a Pressure Sensitive Diaphragm Assembly wherein a bulb contains a gas adsorbing material comprising activated coconut, charcoal granules or other materials such as silica-gel or activated alumina. The adsorbing material has a characteristic of adsorbing gas when subject to dropping temperatures and expelling or giving off gas when heated.

The present invention is concerned with an improvement in such temperature sensing apparatus. The adsorbing element contained in the temperature responsive portion of the system is a member which has a porous oxide coating by alumina treatment so that during the manufacture of the temperature sensing apparatus, the adsorbing element can be inserted into a temperature responsive bulb as a single unit to contain the porous oxide in a unitary and single construction which is easy to handle and simple to manufacture and yet the adsorbing element has all of the properties of granule adsorbing materials which have been used in the prior art.

The invention is shown in the drawings of which

DESCRIPTION OF THE INVENTION

Figure 1:
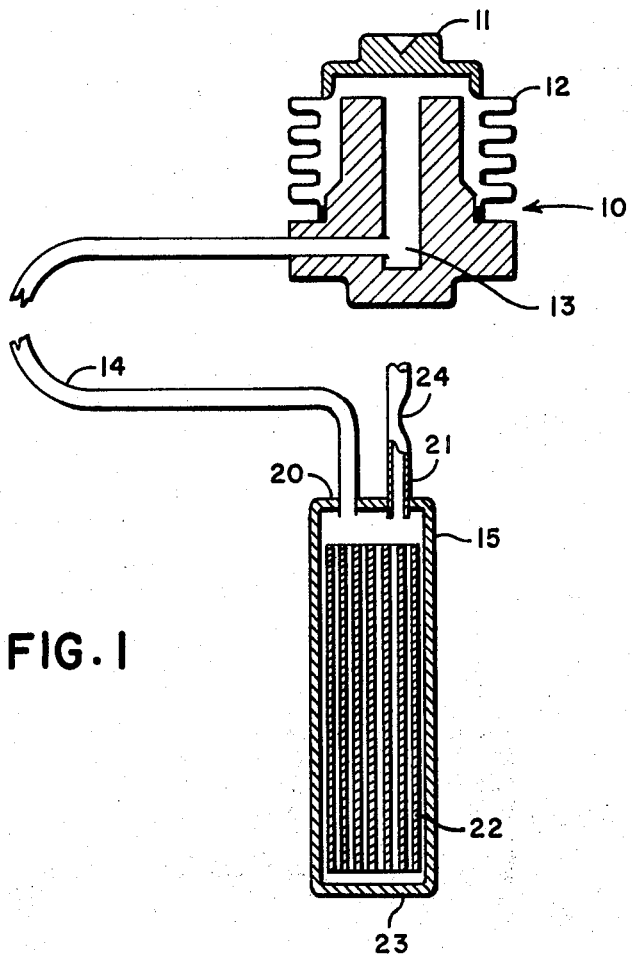
FIG. 1 is a vertical sectional view of the temperature sensing apparatus.

Referring to FIG. 1, the temperature sensing apparatus contains an output device or pressure receiving unit 10 providing a mechanical movement of an output member 11 attached to a bellows 12 when the pressure in a chamber 13 inside the bellows increases. Output device 10 is connected by a conduit or capillary tube 14 to a temperature responsive or sensing element or bulb 15. Bulb 15 might be of any shape, but one embodiment as shown is long and cylindrical to be connected at one end 20 to capillary tube 14 and a fill tube 21.

Contained in bulb 15 is a gas adsorbing member or element 22 which during the manufacture of the temperature sensing apparatus, element 22 is inserted into bulb 15 through a lower end 23 which thereafter is sealed. The air is evacuated or removed from the output device, capillary tube and bulb so the system can be filled with gas under pressure through fill tube 21 which thereafter is sealed or crimped at 24.

The type and kind of gas used in the temperature sensing apparatus is no part of the present invention except the characteristics of the gas are such that as bulb 15 is exposed to a lower temperature the gas is adsorbed in element 22 and upon a reverse operation upon an increase in temperature of bulb 15 the gas is driven off into the system to provide an output at member 11. The output is limited by the amount of gas contained in the system so that at some high temperature all of the gas adsorbed in element 22 is driven off. The temperature limit at which all the gas is driven off is commonly known as the "fade-out" temperature. While many gases might be used, carbon dioxide and/or Freon in the proper quantities insures the proper operation of the temperature sensing apparatus.

Figure 2:
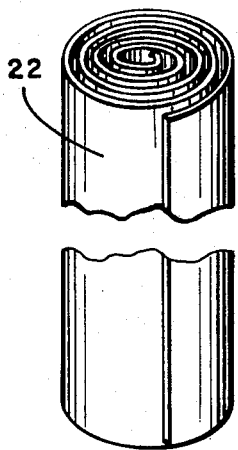
FIG. 2 is a perspective view of the adsorbing element.

The gas adsorbing element 22 is shown in FIG. 2 as a roll of material formed by tightly and cylindrically coiling a sheet of aluminum foil. The aluminum foil has a porous aluminum oxide coating on either one or both sides made by alumina treatment. The porous oxide coating acts as an adsorbing material to adsorb the gas as the temperature decreases. Such an adsorbing element is integrally contained, easy to handle and simple to manufacture. The adsorbing material is attached to the member or aluminum foil and will not migrate into any other part of the temperature sensing apparatus such as fill tube 21 or capillary tube 14 as shown in FIG. 1 after the adsorbing element 22 is placed in bulb 15. By containing the adsorbing material on the foil, particles of adsorbing material will not enter fill tube 21 to hinder the sealing off of the fill tube when a pinching or crimping operation takes place at 24 or when the lower end 23 of the bulb is sealed during the manufacturing process. The gas adsorbing material attached to the foil is therefore absolutely retained in bulb 15.

OPERATION OF THE DEVICE

Figure 3:
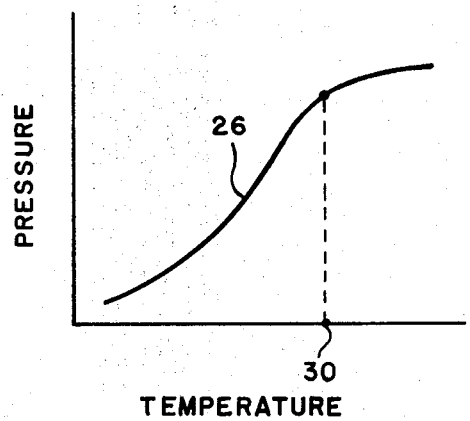
FIG. 3 is a graph showing the relationship between temperature and pressure of the temperature sensing apparatus.

As assembled, as shown in Fig. 1, the temperature sensing apparatus is filled with gas to have a pressure-temperature characteristic as shown in FIG. 3. As the temperature of bulb 15 increases, the gas contained in the adsorbing element 22 is given off into the system to increase the pressure of the system and thus the output of the bellows and member 11. As the temperature increases and the pressure increases, a proportional output is obtained from member 11 in the working range shown by the line 26 or characteristic curve in FIG. 3. When all of the gas in bulb 15 is driven out of element 22 at a temperature shown in FIG. 3 at 30 which is the "fade-out" temperature, output or movement of member 11 is limited. Upon a reversal of the operation by a decrease in the bulb temperature, the gas is adsorbed in the adsorbing element and the pressure in the system drops along the line 26 shown in FIG. 3.

The embodiments of the invention in which an exclusive property or right is claimed are defined as follows:

1. A temperature sensing device, comprising
a temperature sensing bulb,
a gas adsorbing element formed by attaching an adsorbing material to a support member, said element being enclosed in said bulb;
a pressure receiving output means,
means operably connecting said bulb to said output means, and
a gas sealed in said closed space of said bulb, and output means,
said gas adsorbing element being formed by tightly and cylindrically coiling a sheet of aluminum foil having on at least one side a porous oxide coating by alumina treatment is retained in said sensing bulb.

2. A temperature sensing device, comprising
a temperature sensing bulb,
a gas adsorbing element formed by attaching an adsorbing material to a support member, said element being enclosed in said bulb;
a pressure receiving output means,
means operably connecting said bulb to said output means, and
a gas sealed in said closed space of said bulb, and output means,
said gas adsorbing element formed with a sheet of metal having on at least one side a porous oxide coating by alumina treatment is contained in said sensing bulb, said element has a limited gas capacity whereby said gas capacity is exceeded when the temperature of said bulb exceeds some desired temperature limit to limit the pressure developed at excessive temperatures.

* * * * *